US012582059B2

(12) United States Patent
Goldman et al.

(10) Patent No.: US 12,582,059 B2
(45) Date of Patent: ***Mar. 24, 2026

(54) BIOREACTOR AND METHOD FOR CULTURING SEAWEED

(71) Applicant: Australis Holdings, Inc., Greenfield, MA (US)

(72) Inventors: Joshua N. Goldman, Montague, MA (US); Leonardo Mata, Póvoa de Varzim (PT)

(73) Assignee: Australis Holdings, Inc., Greenfield, MA (US)

( * ) Notice: Subject to any disclaimer, the term of this patent is extended or adjusted under 35 U.S.C. 154(b) by 9 days.

This patent is subject to a terminal disclaimer.

(21) Appl. No.: 18/188,094

(22) Filed: Mar. 22, 2023

(65) Prior Publication Data

US 2023/0337610 A1     Oct. 26, 2023

Related U.S. Application Data

(63) Continuation of application No. 17/150,862, filed on Jan. 15, 2021, now Pat. No. 11,638,406.

(60) Provisional application No. 62/965,479, filed on Jan. 24, 2020.

(51) Int. Cl.
*A01G 33/00* (2006.01)
*A01G 7/02* (2006.01)
*A01G 7/04* (2006.01)

(52) U.S. Cl.
CPC .............. *A01G 33/00* (2013.01); *A01G 7/02* (2013.01); *A01G 7/045* (2013.01)

(58) Field of Classification Search
CPC ..................................................... A01G 33/00
See application file for complete search history.

(56) References Cited

U.S. PATENT DOCUMENTS

| | | | |
|---|---|---|---|
| 3,439,449 A | 4/1969 | Huff | |
| 4,235,043 A | 11/1980 | Harasawa et al. | |
| 7,662,615 B2 * | 2/2010 | Chang ................... | C12M 35/02 |
| | | | 435/289.1 |

(Continued)

FOREIGN PATENT DOCUMENTS

WO      2020264391 A1    12/2020

OTHER PUBLICATIONS

"Algae Photobioreactor 15 tons / Hectare—Seeks Asparagopsis taxiformis partners hemp bioplastics" http://scientists.trendolizer.com/2019/02/algae-photobioreactor-15-tons-hectare-seeks-asparagopsis-taxiformis-partners-hemp-bioplastics.html (Accessed Oct. 1, 2019).

(Continued)

*Primary Examiner* — Magdalena Topolski
*Assistant Examiner* — Katherine Anne Kloecker
(74) *Attorney, Agent, or Firm* — Hamilton, Brook, Smith & Reynolds, P.C.

(57) ABSTRACT

A bioreactor includes a first compartment designed to retain seaweed sporophytes, a second compartment in fluid communication with the first compartment that includes one or more settlement surfaces, and a first porous barrier between the first and second compartments that allows the seaweed spores to pass from the first compartment to the second compartment, and systems comprising the bioreactor. Also provided herein are methods of culturing seaweed, for example, using a bioreactor provided herein.

29 Claims, 2 Drawing Sheets

(56) References Cited

U.S. PATENT DOCUMENTS

| 8,092,685 | B1 | | 1/2012 | Gonzalez et al. | |
|---|---|---|---|---|---|
| 9,388,372 | B2 | * | 7/2016 | Wilson | A01K 63/06 |
| 9,683,207 | B2 | * | 6/2017 | Cadwell | C12M 21/00 |
| 9,763,398 | B2 | * | 9/2017 | Deane | C12M 27/18 |
| 9,932,554 | B2 | * | 4/2018 | Im | C12N 1/12 |
| 10,123,495 | B2 | * | 11/2018 | Ordway | A01G 33/00 |
| 10,351,815 | B2 | * | 7/2019 | Hazlebeck | C12M 21/02 |
| 11,240,977 | B2 | * | 2/2022 | Gruskin | A01K 63/06 |
| 11,365,382 | B2 | * | 6/2022 | Patel | C12M 27/20 |
| 11,612,118 | B2 | * | 3/2023 | Gonzalez | C12N 1/12 |
| | | | | | 435/257.1 |
| 11,638,406 | B2 | | 5/2023 | Goldman et al. | |
| 11,788,041 | B2 | * | 10/2023 | Thai | A01G 7/045 |
| | | | | | 435/296.1 |
| 2005/0161388 | A1 | * | 7/2005 | Williams | B01D 63/04 |
| | | | | | 210/321.89 |
| 2007/0134783 | A1 | | 6/2007 | Kakita et al. | |
| 2009/0203116 | A1 | * | 8/2009 | Bazaire | C12M 31/08 |
| | | | | | 435/257.1 |
| 2011/0236932 | A1 | | 9/2011 | Stobbe | |
| 2012/0247008 | A1 | * | 10/2012 | Gonzalez | C12M 21/02 |
| | | | | | 47/1.4 |
| 2013/0196405 | A1 | | 8/2013 | Singh et al. | |
| 2013/0213887 | A1 | * | 8/2013 | Morikawa | C02F 1/441 |
| | | | | | 210/636 |
| 2013/0337548 | A1 | * | 12/2013 | Sims | C12M 27/10 |
| | | | | | 435/257.1 |
| 2014/0065701 | A1 | * | 3/2014 | Kabakian | C12M 23/58 |
| | | | | | 435/308.1 |
| 2017/0305804 | A1 | | 10/2017 | Ayers et al. | |
| 2018/0119083 | A1 | | 5/2018 | Zheng et al. | |
| 2019/0211294 | A1 | | 7/2019 | Karnieli | |
| 2020/0008379 | A1 | | 1/2020 | Ayers et al. | |
| 2021/0267150 | A1 | | 9/2021 | Goldman et al. | |

OTHER PUBLICATIONS

Huang, Yao-ming. "Photobioreactor cultivation of the cell and tissue cultures derived from marine red macroalga *Agardhiella subulata*." Dissertation presented on Mar. 21, 2001.

Ngo, Huu Hao, et al. "Advances of Photobioreactors in Wastewater Treatment: Engineering Aspects, Applications and Future Perspectives." Water and Wastewater Treatment Technologies. Springer, Singapore, 2019. 297-329.

Notification of Transmittal of the International Search Report and Written Opinion of the International Searching Authority for Application No. PCT/US2021/013744, "Bioreactor And Method For Culturing Seaweed," Date of Mailing: Apr. 9, 2021.

Podola, et al. "Porous Substrate Bioreactors: A Paradigm Shift in Microalgal Biotechnology?" Trends in Biotechnology, vol. 35, Issue 2 (Feb. 2017); pp. 121-132; abstract, p. 123 para 1, p. 124, para 1., fig. 2C, fig. 3A.

Nigam, et al., "Photo-bioreactors: Harnessing Solar Energy in Biological Way," Proceedings of the National Academy of Sciences, India Section B: Biological Sciences, vol. 90, Issue 4 (Aug. 28, 2019); pp. 723-732; entire document.

Notice of Allowance for U.S. Appl. No. 17/150,862, entitled Bioreactor And Method For Culturing Seaweed, Date Mailed: Jan. 19, 2023.

* cited by examiner

BIOREACTOR AND METHOD FOR CULTURING SEAWEED

RELATED APPLICATION(S)

This application is a continuation of U.S. application Ser. No. 17/150,862, filed Jan. 15, 2021, now U.S. Pat. No. 11,638,406, issued May 2, 2023, which claims the benefit of U.S. Provisional Application No. 62/965,479, filed on Jan. 24, 2020. The entire teachings of the above applications are incorporated herein by reference.

BACKGROUND

The cattle industry contributes to the emission of greenhouse gases, particularly methane gas, and farm-raised cattle contribute the most, out of all farmed livestock, to greenhouse gas emissions. Cattle feeds composed of certain concentrations of seaweed have resulted in reduced methane emissions from farmed cattle. The solution is possible by feeding farmed cattle a feed that is partially comprised of *Asparagopsis taxiformis* (*A. taxiformis*) or *Asparagopsis armata* (*A. armata*). The cellular structure of these species of seaweed allow them to store increased amounts of halogenated compounds, for example, bromoform. As a result, incorporating these seaweed into the feeds of cattle can help reduce methane emissions of farmed cattle by 80%. Tools for undertaking the growth and cultivation of these species of seaweed would allow for more widescale use of the seaweed in cattle feeds in livestock.

Accordingly, there is a need for a system and method for culturing seaweed species to be used in cattle feeds, serving as a means for reducing greenhouse gas emissions from farm-raised cattle.

SUMMARY

The present invention provides bioreactors, systems and methods for culturing seaweed, e.g., for use in cattle feeds.

In some embodiments, a bioreactor comprises a first compartment designed to retain seaweed sporophytes (e.g., *A. taxiformis* or *A. armata* sporophytes) and a second compartment in fluidic communication with the first compartment that includes one or more settlement surfaces. The first and second compartments have a first porous barrier between them that allows seaweed spores to pass from the first compartment to the second compartment, and prevents seaweed sporophytes from passing from the first compartment to the second compartment.

In some embodiments, a bioreactor comprises a tank; a rigid, plastic porous barrier within the tank; a plurality of removable spools; and one or more air lift pumps. The rigid, plastic porous barrier forms a substantially cylindrical compartment designed to retain seaweed sporophytes, and allow seaweed spores to pass from a first compartment, through the rigid, plastic porous barrier into a second compartment. The plurality of removable spools comprises an attachment substrate and is located circumferentially around the rigid, plastic, porous barrier outside of the substantially cylindrical compartment. The one or more air lift pumps are located outside the substantially cylindrical compartment, and are configured to create a radially outward flow within the bioreactor.

In some embodiments, a system comprises a bioreactor described herein, a reservoir, one or more filters, one or more pumps, and an air blower capable of providing air to the bioreactor. The reservoir, the bioreactor, the one or more filters and the one or more pumps are in fluidic communication.

In some embodiments, a method of culturing *A. taxiformis* or *A. armata* comprises exposing a culture of *A. taxiformis* or *A. armata* to daily light; reducing the hours of daily light to which the sporophytes are exposed, thereby inducing sporogenesis from the sporophytes; and inducing spores resulting from sporogenesis from the sporophytes to attach to one or more settlement surfaces, thereby culturing *A. taxiformis* or *A. armata*.

In some embodiments, a method of culturing *A. taxiformis* or *A. armata* comprises exposing a culture of *A. taxiformis* or *A. armata* sporophytes contained in a first compartment of a bioreactor to daily light; reducing the amount of daily light to which the sporophytes are exposed, thereby inducing sporogenesis from the sporophytes; and inducing *A. taxiformis* or *A. armata* spores resulting from sporogenesis from the sporophytes to pass through a first porous barrier between the first compartment of the bioreactor and a second compartment of the bioreactor in fluidic communication with the first compartment, and attach to one or more settlement surfaces in the second compartment of the bioreactor, wherein the porous barrier allows the spores to pass from the first compartment to the second compartment, and prevents the sporophytes from passing from the first compartment to the second compartment.

Using the bioreactors, systems, and methods disclosed herein, culture of *A. armata* or *A. taxiformis* has resulted in successful and closed life cycles.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
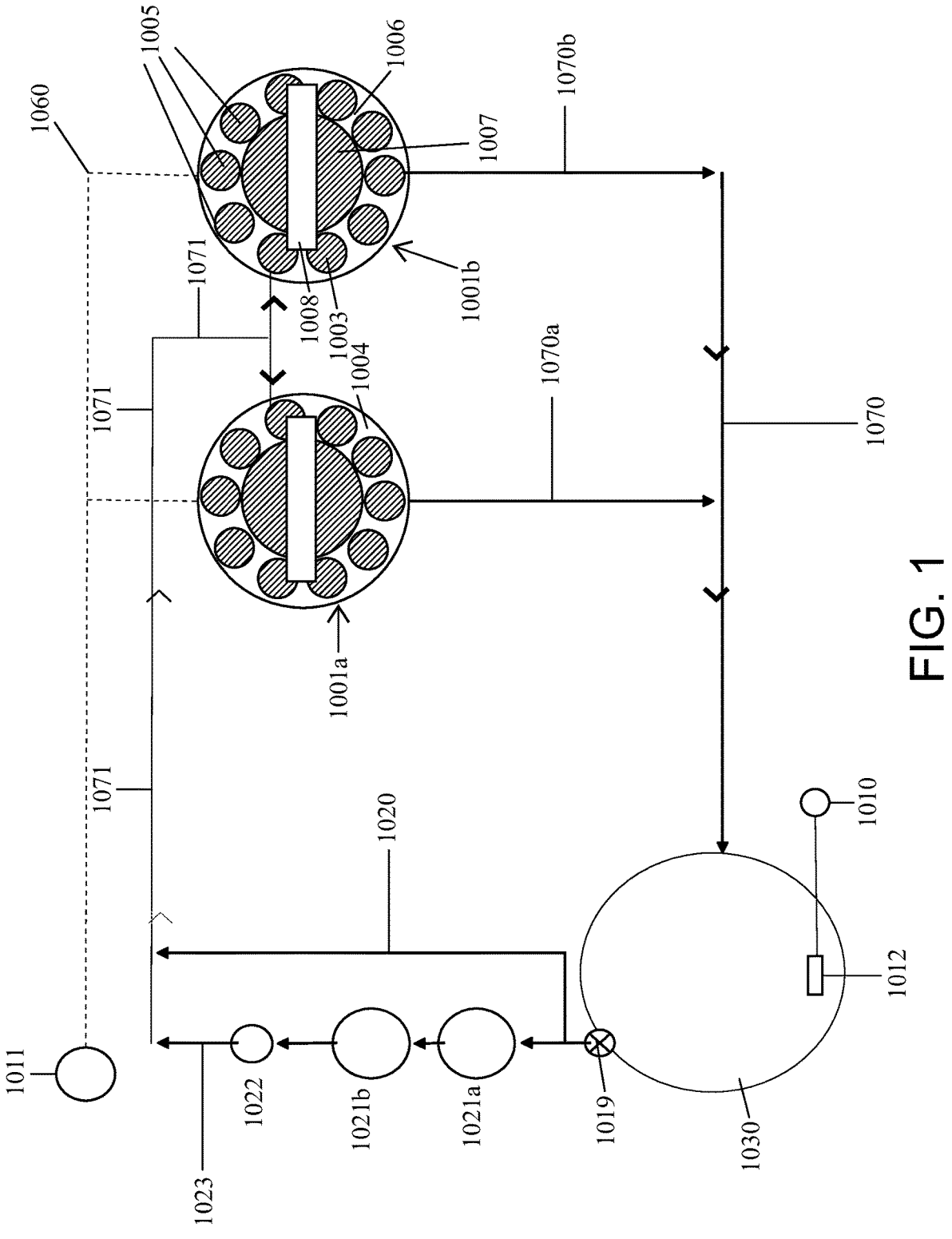
FIG. 1 is a top-view schematic diagram of a system in accordance with an embodiment of the invention

A description of example embodiments follows.

Definitions

"Spore" is defined as a reproductive unit capable of developing into a new organism and can survive for extended periods of time and in unfavorable conditions.

"Sporophyte" is defined as a plant that produces spores, which in turn produce gametophytes that give rise to male and female gametes through the process of meiosis.

"Flow-through" is defined as the constant movement of fluids, solids or gasses in a within a closed system.

"Inlet" is defined as a way of entering, particularly for fluidic passage.

"Outlet" is defined as a way of exiting, particularly for fluidic passage.

"Porous barrier" is defined as a permeable material that allows liquids, gasses and some solids to pass through it, and prevents some solids from passing through it. A porous barrier can be composed of materials such as, but not limited to, polyethylene, polyvinyl chloride, stainless steel, or geofabric, and have pores that range from about 10 μm to about 250 μm, from about 100 μm to about 500 μm, from about 200 μm to about 1000 μm and from about 500 μm to about 1500 μm.

"Compartment" is defined as a section of a structure or container in which certain materials can be kept separate from other materials.

"Settlement surface" is defined as a surface designed to facilitate settlement of seaweed spores on the surface, for example, for subsequent propagation of seaweed gametophytes. A settlement surface can be a rigid surface, e.g., a spool, coated in an attachment substrate. Materials composing the settlement surface include, but are not limited to, polyethylene, polyvinyl chloride, stainless steel, or geofabric.

"Shading mesh" is defined as a material that reduces the amount of light being exposed to a fluid, solid or gas from a light source without lowering the brightness or intensity of the light source.

"Attachment substrate" is defined as a material that facilitates the settlement of seaweed spores on the settlement surface. Examples of attachment substrate include, but are not limited to, twine, rope, yarn, thread, string or geofabric, or a combination thereof.

"Geofabric" is defined as a geosynthetic material, either woven or nonwoven, that facilitates the adhesion of organic material. Examples of geofabrics include, but are not limited to, polypropylene, polyester, nylon and Kevlar.

"Spool" is defined as a cylindrical device on which flexible materials can be wound. Spools are composed of a settlement surface. Spools can have diameters of from about 5 mm to about 10 mm. Spools can be composed of materials such as, but not limited to, polyethylene, polyvinyl chloride, stainless steel, or geofabric, "Light source" is defined as any source of natural or artificial light. Examples of light sources include, but are not limited to, fluorescent light, incandescent light, light emitting diodes and mercury vapor light.

"Photoperiod" is defined as a period of time, each day, during which an organism is exposed to a light source.

"Tumble mode" is defined as a mode of mobilizing a biomass contained in a bioreactor through fluid movement. Typically, the fluid movement is created by induced air flow and submergible pumps, and results in fluid flow within the bioreactor.

"Batch mode" is defined as halting fluid movement through a biomass contained in a bioreactor. Typically, fluid movement is halted by ceasing the induction of air flow into and/or the pumping of fluid within and/or the bioreactor.

When introducing elements disclosed herein, the articles "a," "an," and "the" are intended to mean that there are one or more of the elements.

Bioreactor for Culturing Seaweed

In an embodiment of the present invention, a bioreactor, e.g., used to culture *A. taxiformis* and/or *A. armata*, comprises a first compartment, a second compartment with one or more settlement surfaces, and a first porous barrier between the first and second compartments. The first compartment contains seaweeds sporophytes. The first porous barrier separating the first and second compartments can be substantially defined by pores and allows seaweed spores to pass from the first compartment to the second compartment. In some embodiments, the pores substantially defining the first porous barrier have a diameter of from about 10 μm to about 100 μm. In some embodiments, the series of pores substantially defining the first porous barrier have a diameter ranging from about 100 μm to about 500 μm. In some embodiments, the series of pores substantially defining the first porous barrier have a diameter ranging from about 200 μm to about 1000 μm. In some embodiments, the series of pores substantially defining the first porous barrier have a diameter ranging from about 500 μm to about 1500 μm.

In some embodiments, the bioreactor further comprises an aerator. In some embodiments, the aerator the bioreactor comprises two aerators. The first aerator can be located at the bottom of the first compartment and can be adhered to the porous barrier. The second aerator can be located within the bottom of the second compartment and can be adhered to the porous barrier. In some embodiments, the bioreactor comprises an inlet. The inlet can be located in the first compartment of the bioreactor, and the be equipped with a valve that controls inflow of fluid. In some embodiments, the bioreactor comprises an outlet. The outlet can be located in the first compartment. The outlet can be equipped with a second porous barrier that prevents spores and sporophytes from passing through the second porous barrier. In some embodiments, the bioreactor utilizes one or more pumps, in order to facilitate the flow of fluid from the first compartment to the second compartment. In some embodiments, the one or more pumps utilized by the bioreactor is an air lift pump.

The settlement surfaces located in the second compartment can have a rigid surface and are coated in an attachment substrate. The one or more settlement surfaces can also be removable. In some embodiments, the attachment substrate can be twine. In some embodiments, the attachment substrate can be rope. In some embodiments, the attachment substrate can be yarn. In some embodiments, the attachment substrate can be thread. The first porous barrier of the bioreactor can be made of a rigid material. In some embodiments, the material can be polyethylene. In some embodiments, the material can be polyvinyl chloride. In some embodiments, the material can be stainless steel.

In an embodiment of the invention, a bioreactor used to culture *A. taxiformis* or *A. armata* comprises a tank; a rigid, plastic, porous barrier within the tank forming a substantially cylindrical compartment; a plurality of removable spools coated in attachment substrate; and one or more air lift pumps located outside of the substantially cylindrical compartment. The substantially cylindrical compartment is designed to retain seaweed sporophytes while allowing for fluid within the compartment to pass through pores in the porous barrier to a second substantially cylindrical compartment. In some embodiments, the pores substantially defining the porous barrier have a diameter of from about 10 μm to about 250 μm. In some embodiments, the series of pores substantially defining the first porous barrier have a diameter of from about 100 μm to about 500 μm. In some embodiments, the series of pores substantially defining the first porous barrier have a diameter of from about 200 μm to about 1000 μm. In some embodiments, the series of pores substantially defining the first porous barrier have a diameter of from about 500 μm to about 1500 μm.

The bioreactor tank has an inlet that discharges inside the bottom of the substantially cylindrical compartment that is equipped with a valve that controls fluid inflow. The bioreactor tank also has an outlet equipped with a membrane substantially defined by pores. In some embodiments, the pores substantially defining the membrane have a diameter of from about 10 μm to about 250 μm. In some embodiments, the pores substantially defining the membrane have a diameter of from about 100 μm to about 500 μm. In some embodiments, the pores substantially defining the membrane have a diameter of from about 200 μm to about 1000 μm. In some embodiments, the pores substantially defining the membrane have a diameter of from about 500 μm to about 1500 μm. In some embodiments, the membrane can be of a plastic material. In some embodiments, the membrane can be of a metallic material. In some embodiments, the membrane can be of a polyethylene material. In some embodiments, the membrane can be of a polyvinyl chloride material.

In some embodiments, the attachment substrate is cylindrical in shape. In some embodiments, the attachment substrate is twine. In some embodiments, the attachment substrate is rope. In some embodiments, the attachment substrate is yarn. In some embodiments, the attachment substrate is thread. When an attachment substrate is cylindrical, it can have a diameter of from about 1 mm to about 5 mm. The substantially cylindrical compartment of the bioreactor can be made of a rigid material. In some embodiments, when an attachment substrate is cylindrical, the material can be polyethylene. In some embodiments, when an attachment substrate is cylindrical, the material is polyvinyl chloride. In some embodiments, when an attachment substrate is cylindrical, the material is stainless steel. Each of the removable spools located in the bioreactor have an average diameter of about 25 mm and a height that can be substantially equivalent to the interior height of the second compartment. In some embodiments, each of the removable spools is made of polyethylene. In some embodiments, each of the removable spools is made of polyvinyl chloride. In some embodiments, each of the removable spools is made of stainless steel.

FIG. 1 depicts a system including a bioreactor in accordance with one embodiment of the present invention. Bioreactor tanks 1001a, 1001b provide an environment in which sporogenesis may occur. The bioreactor tanks form part of a system along with one or more pumps 1019; channels 1020, 1023, 1060, 1070, 1070a, 1070b, 1071; filters 1021a, 1021b, 1022; and reservoir 1030. Located within the bioreactor are two compartments. First compartment 1007 can be located in the center of each bioreactor. First compartment 1007 is designed to contain seaweed sporophytes, which can be induced to produce spores through the process of sporogenesis, by the methods disclosed herein. First compartment 1007 is in fluidic communication with second compartment 1004. First and second compartments 1007 and 1004 are separated by first porous barrier 1006. In the bioreactor depicted in FIG. 1, porous barrier 1006 is substantially defined by pores having a diameter of about 1000 μm. The pores allow spores to pass from first compartment 1007 to second compartment 1004, and prevent sporophytes from passing from first compartment 1007 to second compartment 1004.

Bioreactor tank 1001 illustrated in FIG. 1 has a capacity of approximately 100 L and is configured to operate in at least two modes. In particular, bioreactor tank 1001 is configured to operate in tumble mode and in batch mode.

Figure 2:
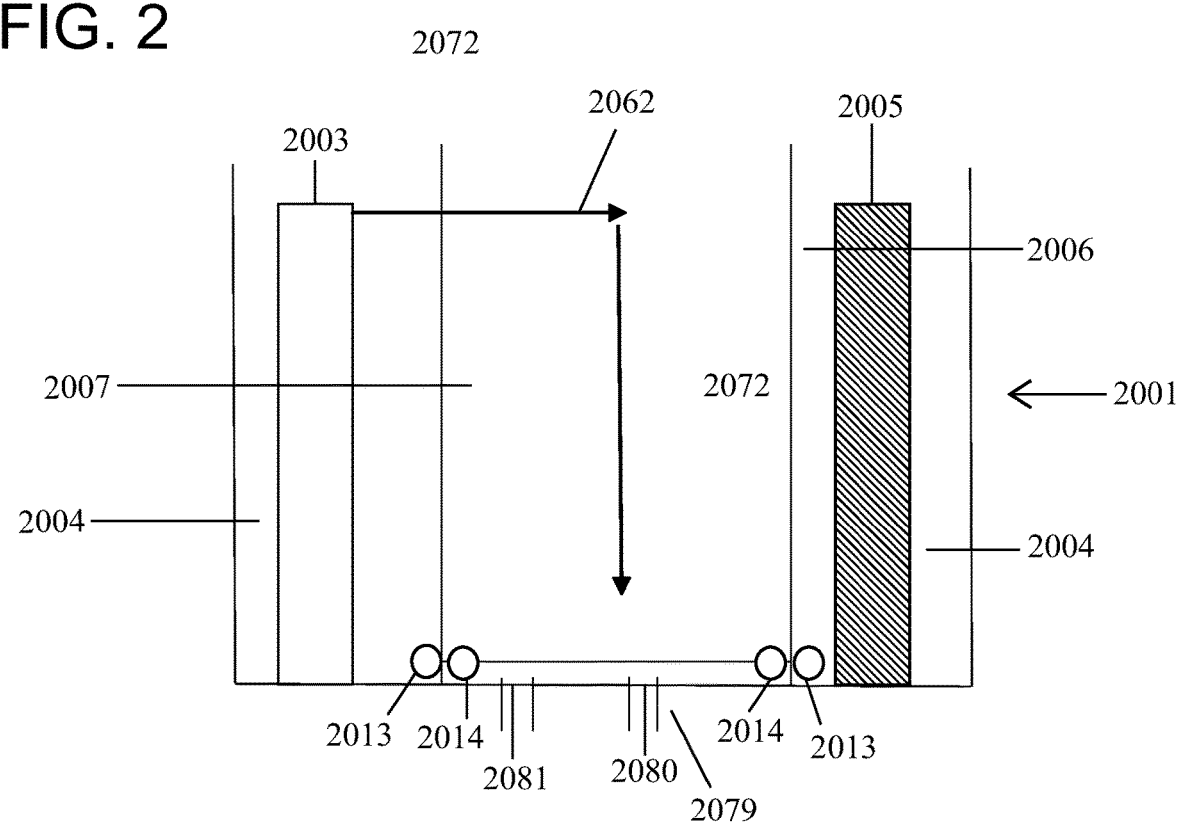
FIG. 2 is a cross-sectional view of a bioreactor in accordance with an embodiment of the invention.

As illustrated in FIG. 2, bioreactor 2001 comprises an inlet 2081 located at the bottom of first compartment 2007, equipped with a valve that controls inflow (not shown). Fluid flows out of bioreactor tank 2001 through outlet 2079, to which a second porous barrier 2080 is connected, as illustrated in FIG. 2. Second porous barrier 2080 connected to outlet 2079 is substantially defined by pores having a diameter of from about 200 μm to about 1000 μm. Water temperature throughout the system can be regulated through a controller, which maintains water temperature within the range of 23-25° C.

As illustrated in FIG. 1, first compartment 1007 is situated in the center of the bioreactor and has a capacity of about 20 L. First compartment 1007 is circumscribed by porous barrier 1006, and is designed to withhold the sporophytes in tumble mode. As further illustrated in FIG. 2, first aeration ring 2014 and second aeration ring 2013 are located within first and second compartments, 1007 and 1004, respectively. Both aeration rings 2013, 2014 are adhered to porous barrier 2006. First aeration ring 2014 is adhered to the bottom of first compartment 2007 and to porous barrier 2006 separating the first and the second compartments. Second aeration ring 2013 is adhered to the bottom of second compartment 2004 and to porous barrier 2006 separating the first and second compartments.

Figure 3:
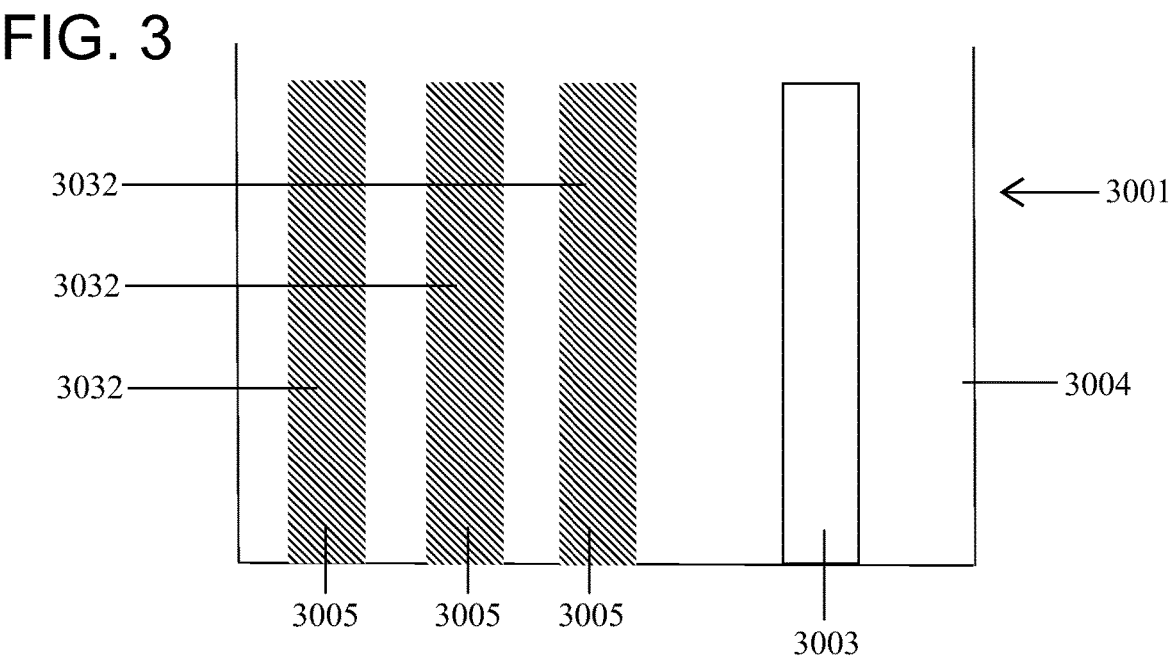
FIG. 3 is a side view of a second compartment of a bioreactor in accordance with an embodiment of the invention.

In some embodiments, second compartment 1004, 3004, as illustrated in FIG. 1 and FIG. 3, of the bioreactor will contain a series of removable spools 1005, 3005 and air lift pumps 1003, 3003. Second compartment 1004, 3004 is in fluid communication with first compartment 1007, the compartments being separated by a first porous barrier 1006. The second compartment 1004 contains a series of spools 1005. The series of spools are radially situated within the second compartment 1004. These spools 1005 are approximately 51 mm in diameter and have a height that is substantially equivalent to the height of the bioreactor tank 1001. These spools are removable from the second compartment and are wrapped in an attachment substrate 3032, as illustrated in FIG. 3, that facilitates adhesion of seaweed spores that have were produced in tumble mode in first compartment 1007, that have subsequently passed through the first porous barrier 1006 and into second compartment 1004.

As depicted in FIG. 3, attachment substrate 3032 wrapped around removable spools 3005 radially situated around the first compartment and within second compartment 3004 is comprised of twine. In other embodiments, the attachment substrate is comprised of yarn. In yet other embodiments, the attachment substrate is comprised of thread. In other embodiments, the attachment substrate is comprised of string. In other embodiments, the attachment substrate is comprised of a geofabric.

*A. taxiformis* and *A. armata*

In an embodiment of the present invention, a settlement surface and/or attachment substrate facilitates adhesion of *A. taxiformis* and/or *A. armata*. *A. taxiformis* typically proliferates in warmer climates, whereas *A. armata* proliferates in colder climates. *A. armata* is morphologically distinct from *A. taxiformis*. However, the diploid tetrasporophyte of both species, known as the Falkenbergia stage, is seemingly morphologically identical in the two species, and phenotypic variation within these species have caused taxonomic confusion. Both species are sources of halogenated compounds, such as dichloromethane, with strong antifungal and antibiotic activity. The general production of biologically active metabolites is inherently linked to an ability to partition compounds into specialized storage structures in order to avoid autotoxicity. These species also produce a pungent aroma, due to an essential oil that is composed mainly of bromoform with smaller amounts of other bromine, chlorine, and iodine-containing methane, ethane, ethanol, acetaldehydes, acetones, 2-acetoxypropanes, propenes, epoxypropanes, acroleins and butenones. The ability to cultivate both species using the bioreactors and methods described herein provides access to useful metabolites for use in cattle feeds.

*Asparagopsis* plants have a diplo-haplontic life cycle with three stages: gamethophytes, carosporophytes and tetrasporophytes. The macroscopic gametophytic "*Asparagopsis*-stage" is the morphologically most complex of the three stages, consisting of a rhizoidal part from which several erect, polysiphonous stems arise. These ramify over and over again into trisiphonous ramuli, thus defining the ultimate thallus. The gametophytes produce male gametes on antheridia and female gametes in carpogonia. Male gametes are released in the water column, and if captured by carpogonia, they fuse with female gametes.

Spermatangial structures are formed in small patches from surface cortical cells. The procarp is formed within the meristem apically on leading cortical filaments. It consists of a supporting cell and a curved 2-celled carpogonial branch. A small tuft of nutritive filaments is produced from this supporting (hypogynous) cell before fertilization. After fertilization, the nuclei of all cells of the carpogonial branch apparatus enlarge, the carpogonium fuses with the hypogynous cell and the nutritive cells are progressively incorporated into the fusion cell. The supporting cell produces secondary assimilatory filaments and the nuclei in the basal cells of these filaments also enlarge, nearly filling each cell. Pit connections expand between neighboring vegetative cells in the axis and basal cells of the developing pericarp during gonimoblast development, followed by fusions that extend into the vegetative axis as the carposporangia mature.

After presumed fertilization, the carpogonium fuses directly with the supporting cell and deposits the diploid nucleus. After diploidization, the supporting cell continues to enlarge and becomes sub-spherical and filled with many nuclei. The functional supporting cells form numerous enucleate protrusions from the cell surface. They contain a mixture of large and small nuclei. The large nuclei correspond to the haploid vegetative nuclei, originally present in the supporting cell prior to the diploidization. The smaller nuclei, presumably diploid, migrate into the enucleate protrusions and are cut off, one in each gonimoblast.

The carposporophyte, remains microscopically small and stays attached to the female gametophyte. The carposporophytes in their turn produce carpospores, which are released in the water column, and upon settlement on other macroalgae, develop into tetrasporophytes called "Falkenbergia-stage." The latter look like fluffy pom-poms consisting of ramifying trisiphonal filaments. The tetrasporophytes in their turn form tetraspores, which result from meiosis. These tetraspores are released into the water column and upon settlement on the substratum develop into a new generation of gametophytes.

Both *A. armata* and *A. taxiformis* include the Falkenbergia-stage in their life cycle, which was considered to be an entirely different species. Falkenbergia rufolanosa (Harvey) Schmitz was the original description of the tetrasporophyte of *A. armata* and *F. hillebrandii* (Bomet) Falkenberg was that of *A. taxiformis*. These two Falkenbergia stages were thought to be morphologically identical, though there were different sizes of the terminal cells between the two species when maintained in culture. The *Asparagopsis* stages are morphologically distinct, *A. armata* has spinose branches, highly elongate erect branches, and a sprawling habit in which the spines entangle among other benthic organisms. *A. taxiformis* has a more compact rhizoidal system, lacks spiny branches, and forms more patchy tufts.

*A. taxiformis* occurs on reefs and rocky shores throughout the tropical and warm-temperate parts of the Atlantic and Indo-Pacific. *A. armata* seems to be a temperate species. It is native to southern Australia and New Zealand, but is found also along the Chilean coast, in South Africa, California, and in the northern Atlantic (the British Isles, Atlantic France, Spain and Portugal, the Azores, Canary Islands, Salvage Islands, and Senegal. In the Mediterranean Sea, *A. armata* is encountered in the western basin, whereas *A. taxiformis* seems to be confined to the eastern Mediterranean. The distribution ranges of the two species appear to overlap along the Italian shores.

Bioreactor System

In some embodiments, the bioreactor comprises a reservoir, an air blower, one or more pumps and one or more channels. In some embodiments, the bioreactor, the reservoir, the one or more filters, and the one or more pumps form a circuit, whereby fluid flowing from the reservoir to the bioreactor tank returns to the reservoir through one or more channels. Located along the channels are a series of one or more filters. Located along the channels can be one or more ultraviolet filters and one or more particle filters. In some embodiments, the ultraviolet filter is downstream of the one or more particle filters. The particle filters are defined by a mesh material. In some embodiments, the openings of the mesh material have a diameter of from about 10 µm to about 100 µm. In some embodiments, the openings of the mesh material have a diameter from about 10 µm to about 200 µm. A light source can be configured to supply light to a surface of fluid in the bioreactor tank. The bioreactor and the environmental conditions surrounding it can be managed using an interfacing controller.

The bioreactor's reservoir can be positioned such that fluid flowing out of the bioreactor through the outlet at the bottom of the bioreactor tank flows to the reservoir by gravity. The outlet of the bioreactor tank can be defined by a porous barrier. The porous barrier is substantially defined by pores. In some embodiments, the pores have a diameter of from about 10 µm to about 250 µm. In some embodiments, the pores have a diameter of from about 100 µm to about 500 µm. In some embodiments, the pores have a diameter of from about 200 µm to about 1000 µm. In some embodiments, the pores have a diameter of from about 500 µm to about 1500 µm. The reservoir can contain a ceramic diffuser that releases carbon dioxide into fluid within the reservoir. The reservoir can also contain one or more submergible pumps that facilitate the transport of fluid inside the reservoir through a series of one or more channels back into the bioreactor. It is along these one or more channels that the one or more filters can be located.

In accordance with an embodiment of the present invention, and as illustrated in FIG. 2, in operation, one or more air lift pumps 2003 are placed outside the first compartment. Air lift pumps 2003 are configured to create a radially outward flow within bioreactor tank 1001, as shown by arrows 2062. Air lift pumps 2003 create the radially outward flow by moving the water from the second compartment back into first compartment (top fed) 2072, as illustrated in FIG. 2, to help transport the spores from first compartment 2007 to second compartment 2004, where the removable spools facilitating adhesion are located.

As illustrated in FIG. 1, reservoir 1030 has a capacity of approximately 500 L (primarily for sump fluid), is located downstream of bioreactor tanks 1001 and is temperature controlled. The reservoir contains a ceramic diffuser 1012, which is in communication with one or more carbon dioxide cylinders 1010. In operation, carbon dioxide cylinders 1010 inject carbon dioxide into fluid in the reservoir through ceramic diffuser 1012. The level of injected carbon dioxide is adjustable through a needle valve (not shown). In operation, the needle valve controls the flow of carbon dioxide into reservoir 1030 through an arrangement that permits a gradual increase or decrease in the size of the opening through which carbon dioxide flows into reservoir 1030. A pH controller may be added to activate a solenoid valve to turn the carbon dioxide cylinders on and off. Carbon dioxide is diffused into reservoir 1030, adjusted through a needle valve and a pH controller to turn it on or off when the pH falls outside the range of 6.8-7.5. In the system depicted in FIG. 1, gravity allows for the water from one or more bioreactor tanks 1001 to flow out of out of one or more bioreactor tanks 1001 through a channel 1070, 1070a, 1070b and into reservoir 1030.

In accordance with an embodiment of the present invention and as illustrated in FIG. 1, reservoir 1030 has a submergible pump 1019 that moves up to approximately 200 L of water per hour out of reservoir 1030. In operation, that equates to approximately one complete renewal of each bioreactor tank per hour. Fluid pumped out of reservoir 1030 can either travel through a first channel 1023, along which there are one or more particle filters 1021a, 1021b and one or more ultraviolet (UV) filters 1022. Alternatively, fluid can travel through a second channel 1020 that bypasses the filters. Fluid traveling through either channel 1023 or 1020 then flows into channel 1071 that allows for flow of fluids back into bioreactor tank 1001.

In accordance with an embodiment of the present invention and as illustrated in FIG. 1, the system utilizes one or more particle filters 1021a, 1021b and an ultraviolet filter 1022. The particle filters 1021a, 1021b are cartridge filters. Filter 1021a has a pore size rating of 200 μm, and filter 1021b has a pore size rating of 100 μm. UV filter 1022 is located downstream from one or more particle filters 1021a, 1021b. UV filter 1022 is comprised of a UV lamp that produces 80,000 mw/s on 600 l/hour flow.

Digital Processing Environment

In some embodiments, the system can be adjusted using one or more controllers that interface with components of the bioreactor. The controller can be configured to manage pumps, nutrient delivery, light exposure, fluidic flow, pH, carbon dioxide content, fluids traveling through the system, air flow and temperature. In some embodiments, for example, the controller may integrate predictive algorithms to regulate the nutrient delivery, light exposure, fluidic flow, pH, carbon dioxide content in fluids traveling through the system, air flow and temperature. In some embodiments, the controller may regulate release of the air and/or fluid at a variable rate which anticipates optimal flow to optimize spore growth and spore attachment to one or more settlement surfaces. In other embodiments, the controller may be in communication with one or more sensors that monitor air flow, carbon dioxide, and oxygen levels. The controller may cause solenoid valves to be activated. The controller may cause carbon dioxide to be injected into fluid in the reservoir through a ceramic diffuser. The controller may execute algorithms that monitor the carbon dioxide and light levels to ensure that they do not exceed or go below setpoints.

In some embodiments, the controller may be in communication with one or more components of the bioreactor, such as an air blower, one or more pumps, e.g. air lift pumps, submergible pumps. The controller may control such components to control the air and fluid provided to the bioreactor. For instance, the controller may control the air blower and air lift pumps to direct in order to facilitate the flow of fluid from the first compartment to the second compartment of the bioreactor. The controller may control processes, such as the batch mode, for example, by directing and/or halting fluid movement through a biomass contained in the bioreactor. In this example, the controller may halt fluid by causing the induction of air flow and/or the pumping of fluid within the bioreactor to cease. The controller may control the operation of one or more valves coupled to the reactor. For instance, the controller may direct the valves to an open or closed position to control air or fluid flow (e.g. inflow and/or outflow).

Example implementations of controllers to manage and monitor nutrient delivery, light exposure, fluidic flow, pH, carbon dioxide content, fluids traveling through the system, air flow and temperature of the bioreactor and its components may be implemented in a software, firmware, or hardware environment. Client computers/devices and server computer/devices (or a cloud network) may provide processing, storage, and input/output devices executing application programs and the like.

Client computers/devices may be linked directly or through communications network to other computing devices, including other client computers/devices and server computer/devices. The communication network can be part of a wireless or wired network, remote access network, a global network (i.e. Internet), a worldwide collection of computers, local area or wide area networks, and gateways, routers, and switches that currently use a variety of protocols (e.g. TCP/IP, Bluetooth®, RTM, etc.) to communicate with one another. The communication network may take a variety of forms, including, but not limited to, a data network, voice network (e.g. land-line, mobile, etc.), audio network, video network, satellite network, radio network, and pager network. Other electronic device/computer networks architectures are also suitable.

Client computers/devices may be valve controllers, sensors, water quality monitoring equipment, meters, instruments, water sensors, light sensors, temperature sensors, and technology for sampling, data logging, analysis, and water resource management that monitor and log conditions in the bioreactor. Server computers may be controllers configured to provide a controlled bioreactor system which communicates with client devices. The server computers may not be separate server computers but part of cloud network. In some embodiments, a server computer (controller) may operate locally within the bioreactor. In these embodiment and other embodiments, the controller may be an industrial programmable logic controller (PLC), or other such controller configured with firmware similar to PLC firmware. The sensors may communicate information regarding the conditions of a bioreactor, such as the water quality and gas concentrations or temperature, to the controllers. In some embodiments, the sensors and instruments may include client applications executing on the sensors for monitoring and logging the conditions, and communicating the information regarding the conditions to the controllers. Client computers/devices may also be devices to configure the sensors and controllers, such as controlling carbon dioxide concentration thresholds in the interior of the bioreactor.

The computer/computing node (e.g., client processor/device or server computers) may be used to facilitate processing audio, image, video or data signal information. Memory coupled to the client processor/device or server computers provides volatile storage for computer software instructions and data used to implement software implementations of certain embodiments of the bioreactor (e.g. controllers, water quality monitoring equipment, meters, instruments, water sensors, and sensors).

Software components of the controller(s) described herein may be configured using any programming language, including any high-level, object-oriented programming language. The server may include instances of the client (e.g., sensors) that communicates to the server (e.g., controller) utilizing various means, including encrypted data packets (e.g. via SSL), and may contain information regarding nutrient delivery, light exposure, fluidic flow, pH, carbon dioxide content, fluids traveling through the system, air flow and temperature of the bioreactor. In addition, the system may include other instances of client processes executing on other client computers/devices, such as a client application that may communicate with the server (e.g., controller) to configure the parameters for releasing or shutting valves in the bioreactor. In some embodiments, the computing device for configuring the parameters may be implemented via a software embodiment and may operate, at least partially, within a browser session.

In an example mobile implementation, a mobile agent implementation of the invention may be provided. A client server environment can be used to enable mobile configuration or monitoring of the sensors, valves, water quality, etc. It can use, for example, the XMPP protocol to tether a configuration server on a device to controller or sensor. The server can then issue commands via the mobile phone on request. The mobile user interface framework to access certain components of the system may be based on XHP, Javelin and WURFL. In another example mobile implementation for OS X, iOS, and Android operating systems and their respective APIs, Cocoa and Cocoa Touch may be used to implement the client-side components using Objective-C or any other high-level programming language that adds Smalltalk-style messaging to the C programming language.

The system may also include instances of server processes on the server computers that may comprise a controller, which monitor the sensors and valve positions of the bioreactor to monitor concentration of carbon dioxide, sunlight, or nutrients in the bioreactor, such as an ultra-low nutrient, light or carbon dioxide concentration, and the controller can adjust the valves and sensors based on detected conditions of the controlled environment to induce sporogenesis. The system may also include instances of server processes which release compressed gas, control nutrient delivery, increase/ decrease light exposure, control fluidic flow, control pH, control carbon dioxide content, control air flow and increase/decrease temperature into the interior of the bioreactor at various rates of release, and logs (e.g. nutrient, light or carbon dioxide concentrations or temperature) in the bioreactor to induce sporogenesi. In some embodiments, the server processes may comprise an industrial PLC, or other such controller configured with firmware similar to PLC firmware.

Disk storage provides non-volatile storage for computer software instructions (equivalently "OS program") and data 116 used to implement embodiments of the bioreactor. The system may include disk storage accessible to the server computer. The server computer (e.g., controller) or client computer (e.g., sensors) may store information, such as logs, regarding the gas concentrations or temperature of the bioreactor's environment. Executing instances of respective software components of the bioreactor's system components, may be implemented as computer program products (e.g., PLC firmware), and can be installed by any suitable software installation procedure, as is well known in the art. In another embodiment, at least a portion of the system software instructions may be downloaded over a cable, communication and/or wireless connection via, for example, a browser SSL session or through an app (whether executed from a mobile or other computing device). In other embodiments, the system software components, may be implemented as a computer program propagated signal product embodied on a propagated signal on a propagation medium (e.g. a radio wave, an infrared wave, a laser wave, a sound wave, or an electrical wave propagated over a global network such as the Internet, or other networks.

Methods of Culturing *A. taxiformis* and *A. armata*

In an embodiment, a method of culturing seaweed (e.g., *A. taxiformis* or *A. armata*) comprising exposing the sporophytes of these species of seaweed to daily light, inducing sporogenesis by reducing the daily light and inducing the resulting spores to attach to one or more settlement surfaces. The light source used in culturing the seaweed species is positioned to supply light to a surface of a liquid in a bioreactor. In some embodiments, the light source is a light emitting diode. In some embodiments, the light source is a fluorescent light. In some embodiments, the light source is an incandescent light.

In some embodiments, a method of culturing *A. taxiformis* or *A. armata* comprises exposing the seaweed species to alternating periods of light and darkness. In some embodiments, the alternating periods of light and darkness occur over a duration ranging from about one week to about two weeks. In some embodiments, the alternating periods of light and darkness can occur over a period of time of from about two weeks to about four weeks. In some embodiments, the alternating periods of light and darkness occur over a period of time of from about four weeks to about six weeks.

In some embodiments, the amount of daily light can be reduced and a new alternating period of light and darkness can be established. In some embodiments, the alternating periods of light and darkness can occur over a period of time of from about one week to about two weeks. In some embodiments, the alternating periods of light and darkness can occur over a period of time of from about two weeks to about four weeks. In some embodiments, the alternating periods of light and darkness occur over a period of time of from about four weeks to about six weeks.

During the alternating periods of light and darkness, the seaweed sporophytes can be supplied a commercial nutrient mix. Sporogenesis occurs as fluid and nutrients pass through to the bioreactor during a stage in the method referred to as batch mode. During batch mode, the light to which sporophytes are exposed can be reduced, inducing sporogenesis. Following batch mode, spores produced during sporogenesis can be induced to move toward and attach to one or more settlement surfaces coated in attachment substrate. That stage of the method is referred to as tumble mode. During tumble mode, sufficient aeration creates an upward flow within the culture while exposing the culture to daily light or reducing the amount of daily light to which the sporophytes are exposed.

In some embodiments, the method can be performed in a bioreactor and/or system described herein. In some embodiments, the method comprises exposing a culture of seaweed sporophytes (e.g., *A. taxiformis* or *A. armata*) in a first compartment of a bioreactor to daily light. Reducing the amount of time that sporophytes are exposed to daily light induces sporogenesis, resulting in the production of spores. In some embodiments, spores produced in a first compartment of a bioreactor tank are induced to pass through to a second compartment of the bioreactor tank. A light source can be located directly above the surface of a liquid in a bioreactor. In some embodiments, the light source can be a light emitting diode. In some embodiments, the light source can be an incandescent light. In some embodiments the light source can be a fluorescent light. In some embodiments, spores pass from a first compartment, through a porous barrier and into a second compartment of a bioreactor.

In some embodiments, the method comprises culturing *A. taxiformis*. In some embodiments, the method comprises culturing *A. armata*. In an embodiment of the present invention, a method for culturing *A. taxiformis* or *A. armata* comprises exposing a culture of *A. taxiformis* or *A. armata* sporophytes contained in a first compartment of a bioreactor tank to daily light. In some embodiments, the method comprises inducing spores resulting from sporogenesis to pass through a first porous barrier between the first and second compartments. In some embodiments, spores pass through the first porous barrier between the first and second compartments as air enters the first compartment through an air pump, forcing fluid in the first compartment to flow outward into the second compartment. As fluid flows in that manner, the first porous barrier allows only spores to pass through into the second compartment. The first and second compartments are in fluidic communication with each other through the first porous barrier.

In some embodiments of the present invention, no water flows through the tanks. When this occurs, it allows for a batch mode culture of seaweed spores to develop, typically, following the induction of sporogenesis (3-4 weeks after induction). During this period, seaweed spores are confined inside the first compartment, which can be substantially cylindrical, of the bioreactor tank.

In accordance with an embodiment of the present invention, a nutrient mix is added to reservoir 1030. In operation, the nutrient mix consists of a commercial nutrient mix for algae, with N and P diluted 10× in the tanks on a weekly basis. Ammonium will be supplemented on a drop-by-drop basis into reservoir 1030, as well to maintain optimal growth.

In some embodiments the light source can be positioned above a fluid surface of the bioreactor tank. In some embodiments, the method of culturing *A. taxiformis* or *A. armata* comprises exposing the seaweed species to alternating periods of light and darkness. In some embodiments, the alternating periods of light and darkness occur over a period of time of from about one week to about two weeks. In some embodiments, the alternating periods of light and darkness occur over a period of time of from about two weeks to about four weeks. In some embodiments, the alternating periods of light and darkness occur over a period of time of from about four weeks to about six weeks. In some embodiments, after exposing the seaweed to alternating periods of light and darkness over a duration of weeks, the amount of daily light can be reduced and a second alternating period of light and darkness is established. In some embodiments, the second alternating periods of light and darkness occur over a period of time of from about one week to about two weeks. In some embodiments, the alternating periods of light and darkness occur over a period of time of from about two weeks to about four weeks. In some embodiments, the alternating periods of light and darkness occur over a period of time of from about four weeks to about six weeks.

In some embodiments, the method comprises supplying seaweed sporophytes nutrients using a commercial nutrient mix during the alternating periods of light exposure. Sporogenesis occurs as fluid and nutrients pass through to the bioreactor during a stage in the method referred to as batch mode. During batch mode, the light to which sporophytes are exposed is reduced, inducing sporogenesis. Following batch mode, spores produced during sporogenesis are induced to attach to one or more settlement surfaces coated in attachment substrate by induced air causing flow of fluid, which is referred to as tumble mode. During tumble mode, sufficient aeration creates an upward flow within the culture while exposing the culture to daily light or reducing the amount of daily light to which the sporophytes are exposed.

In some embodiments, fluid movement can be induced by air pumps located in the second compartment of the bioreactor tank. Fluid movement within the first compartment of the bioreactor tank can occur through induced air flow through one or more aeration rings. In some embodiments, the aeration ring(s) can be substantially defined by openings that measure about 1 mm in diameter. In some embodiments, each opening defining each aeration ring can be located about 15 cm from another opening in the aeration ring(s). In operation, aerating the culture helps create an upward flow within the culture, assisting the culture's exposure to daily light, thereby aiding the induction of sporogenesis.

As depicted in FIG. 1, a light source 1008 is located above bioreactor tank 1001. In operation, light source 1008 positioned above the tanks will have a capacity to supply approximately 200 umol/m²s at the liquid surface of bioreactor tank 1001. The amount of light to which sporophytes and spores are exposed may be altered by adjusting light source's 1008 distance to bioreactor tank 1001 or by using a shading mesh, depending on the density of the seaweed. Light exposure may also be controlled using a timer linked to a controller interface, thereby setting a controlled photoperiod.

Exposure of cultures of either *A. taxiformis* or *A. armata* sporophytes in first compartment 1007, as depicted in FIG. 1, of bioreactor tank 1001 to daily light, consisting of certain periods of light and darkness, will induce sporogenesis. In accordance with an embodiment of the invention, sporophyte cultures are exposed to alternating periods of about 14 hours of light and about 10 hours of darkness. Further in accordance with an embodiment of the present invention, that photoperiod will occur daily for approximately two to four weeks. Following that two to four-week period and further in accordance with an embodiment of the invention, the photoperiod will then be adjusted to 8 hours of light and 16 hours of darkness for a period of time lasting up to about six weeks.

In accordance with an embodiment of the present invention, cultures of either *A. taxiformis* or *A. armata* sporophytes are provided nutrients by use of a commercial nutrient mix, which is first deposited into a reservoir 1030, as illustrated in FIG. 1, and then passes through a channel 1071 to bioreactor tank 1001. In operation, the nutrient mix is a commercial nutrient mix for algae, with N and P diluted 10× and subsequently added to reservoir 1030 on a weekly basis. As sporophyte culture light exposure is reduced, the system operates in flow-through tumble mode, altogether increasing the biomass of the sporophyte culture through higher rates of induced seaweed sporogenesis. While in tumble mode, the culture is provided nutrients and kept in suspension using induced air from an air blower 1011, depicted in FIG. 1, flowing through an air channel 1060 and into one or more aeration rings 2013, 2014, depicted in FIG. 2.

Once sufficient seaweed spores are produced, the system then operates in batch mode, at which time the culture is induced to travel into the second compartment of bioreactor 1001 and to adhere to spools 1005 wrapped in an attachment substrate, facilitating adhesion. The movement of spores from the first compartment to the second compartment is facilitated by induced air flow. As depicted in FIG. 1, air flows from an air blower 1011, located above the water surface, and travels into the bioreactor tank 1001 through a channel 1060 to one or more air lift pumps 1003. In operation, as air flows into bioreactor tank 1001 through one or more air lift pumps 1003, water moves from second compartment 1004 back into the bottom of first compartment 1007, thereby inducing the movement of spores in the first compartment through first compartment's first porous barrier 1006 and into second compartment 1004, where spools 1005 wrapped in an attachment substrate are located.

After spores attach to settlement surfaces 2005, as depicted in FIG. 2, in the second compartment 2004 of bioreactor tank 2001, water is then drained through a second porous barrier 2079 defined by pores 2080, preventing the seaweed sporophytes from passing through the second porous barrier. As depicted in FIG. 1, water exiting bioreactor tank 1001 travels through a channel 1070, 1070*a*, 1070*b* and into reservoir 1030. Reservoir 1030 is positioned below bioreactor tank 1001, so fluids from bioreactor tank 1001 flows to reservoir 1030 by gravity. Once fluid passes into reservoir 1030, carbon dioxide is released into reservoir 1030 through a ceramic bubble diffuser 1012. The amount of carbon dioxide being released is adjustable with a needle valve and using the controller interface. Carbon dioxide is diffused in reservoir 1030 when pH falls outside the range of about 6.8 to about 7.5.

Fluid is channeled out of reservoir 1030, as depicted in FIG. 1, through submergible pump 1019. In some embodiments, fluid exiting reservoir 1030 flows through channel 1023, along which are located one or more filters. In accordance with an embodiment of the present invention, fluid can flow through one or more particle filters 1021*a*, 1021*b*. In accordance with another embodiment of the present invention, fluid can flow through one or more UV filters 1022. In accordance with another embodiment of the present invention, fluid can flow through one or more particle filters 1021*a*, 1021*b* and one or more UV filters 1022. In accordance with yet another embodiment of the present invention, fluid can flow through bypass channel 1020, along which there are no filters. In operation, after passing through either filtered channel 1023 or bypass channel 1020, fluid then enters channel 1071 flowing back to bioreactor tank 1001.

The teachings of all patents, published applications and references cited herein are incorporated by reference in their entirety.

It should be understood that the bioreactor, system or methods may include more or fewer elements, be arranged differently, or be represented differently. It further should be understood that certain implementations may dictate the bioreactor, system or methods.

While this invention has been particularly shown and described with references to embodiments thereof, it will be understood by those skilled in the art that various changes in form and details may be made therein without departing from the scope of the invention encompassed by the appended claims.

What is claimed is:

1. A system comprising:
a bioreactor;
a reservoir;
one or more filters;
one or more pumps;
one or more settlement surfaces, the one or more settlement surfaces including one or more spools;
an air blower capable of providing air to the bioreactor; and
a controller that interfaces with the system and manages one or more conditions within the system, wherein the reservoir, the bioreactor, the one or more filters, and the one or more pumps are capable of being in fluid communication, and wherein the controller is configured to manage culturing *A. taxiformis* and *A. armata* by:
exposing a culture of *A. taxiformis* or *A. armata* sporophytes to daily light;
reducing hours of the daily light to which the sporophytes are exposed, thereby inducing sporogenesis from the sporophytes; and
inducing spores resulting from the sporogenesis from the sporophytes to attach to the one or more settlement surfaces,
thereby culturing the *A. taxiformis* or the *A. armata*.

2. The system of claim 1, further comprising a first aerator positioned within a first compartment of the bioreactor.

3. The system of claim 2, further comprising a second aerator positioned within a second compartment of the bioreactor.

4. The system of claim 1, further comprising an inlet equipped with a valve that controls inflow.

5. The system of claim 1, further comprising an outlet equipped with a porous barrier that prevents seaweed spores and seaweed sporophytes from passing from the bioreactor through the porous barrier.

6. The system of claim 2, wherein the one or more pumps are configured to create a flow from the first compartment to a second compartment within the bioreactor.

7. The system of claim 1, wherein the one or more spools include a rigid surface coated in an attachment substrate.

8. The system of claim 1, wherein the one or more spools are removable from the bioreactor.

9. The system of claim 7, wherein the attachment substrate includes twine, rope, yarn, thread, string, geofabric, or a combination thereof.

10. The system of claim 3, further comprising a porous barrier positioned between the first compartment and the second compartment, the porous barrier including polyethylene, polyvinyl chloride, stainless steel or geofabric.

11. The system of claim 10, wherein the porous barrier includes pores having a mean diameter of from about 200 $\mu$m to about 1000 $\mu$m.

12. The system of claim 1, wherein the bioreactor, the reservoir, the one or more filters, and the one or more pumps form a circuit, whereby fluid flowing from the reservoir to the bioreactor returns to the reservoir after flowing through the bioreactor.

13. The system of claim 12, further comprising a light source configured to supply light to a surface of liquid in the bioreactor.

14. The system of claim 13, wherein the light source is a light emitting diode.

15. The system of claim 1, wherein the one or more filters are in series.

16. The system of claim 1, wherein the one or more filters comprises one or more particle filters and an ultraviolet filter.

17. The system of claim 1, wherein the reservoir is positioned such that outflow from the bioreactor flows to the reservoir by gravity.

18. The system of claim 1, wherein the daily light is supplied by a light source positioned to supply light to a surface of liquid in the bioreactor.

19. The system of claim 1, wherein the controller is further configured to expose the culture to alternating periods of 14 hours of light and 10 hours of darkness.

20. The system of claim 1, wherein the controller includes one or more electronic controllers executing predictive algorithms to:

regulate induction of air flow in the bioreactor;

control pumping of the fluid within the bioreactor;

monitor compositions of carbon dioxide, light, and nutrients in the bioreactor; and receive input from one or more sensors coupled to the bioreactor to monitor a composition of light and water in the bioreactor, and to maintain an electronic record of at least one of: (a) temperature, (b) concentrations of a mixture of gases, and (c) concentrations of a mixture of nutrients in the bioreactor.

21. The system of claim 1, wherein the one or more spools are wrapped in an attachment substrate.

22. The system of claim 1, further comprising:

a first compartment and a second compartment of the bioreactor, the second compartment including the one or more spools.

23. The system of claim 1, wherein the one or more spools includes polyethylene, polyvinyl chloride, stainless steel, or geofabric.

24. The system of claim 1, wherein the one or more spools are designed to facilitate settlement of seaweed spores on the one or more settlement surfaces.

25. The system of claim 24, wherein the settlement of the seaweed spores is for subsequent propagation of seaweed gametophytes.

26. The system of claim 1, further comprising:

one or more cylinders in communication with the reservoir, the one or more cylinders operable to inject carbon dioxide into fluid in the reservoir.

27. The system of claim 1, wherein the controller is further configured to:

halt fluid movement through the bioreactor.

28. The system of claim 27, wherein the controller is further configured to halt the fluid movement through the bioreactor by:

ceasing at least one of (i) induction of air flow into the bioreactor and (ii) pumping of fluid within the bioreactor.

29. The system of claim 1, wherein the one or more filters are located downstream of the reservoir and upstream of the bioreactor.

* * * * *